Figure 1:
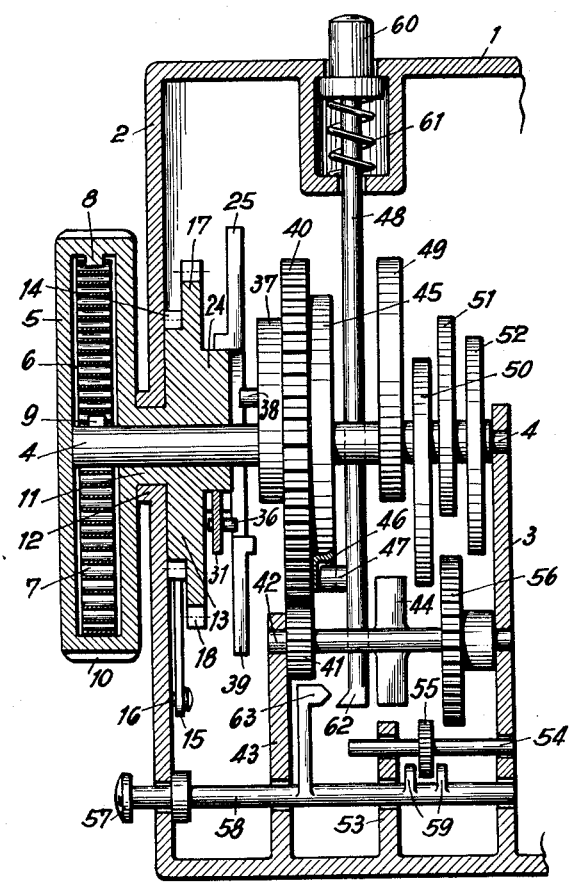

Jan. 10, 1956  F. FAULHABER  2,730,025
PHOTOGRAPHIC REFLEX CAMERAS

Filed Dec. 10, 1952  4 Sheets-Sheet 1

INVENTOR
Fritz Faulhaber
By: Mock + Blum
ATTORNEYS

Jan. 10, 1956 F. FAULHABER 2,730,025

PHOTOGRAPHIC REFLEX CAMERAS

Filed Dec. 10, 1952 4 Sheets-Sheet 2

INVENTOR
Fritz Faulhaber
By: Moxr Blum
ATTORNEYS

Jan. 10, 1956　　　F. FAULHABER　　　2,730,025
PHOTOGRAPHIC REFLEX CAMERAS
Filed Dec. 10, 1952　　　　　　　　4 Sheets-Sheet 3

INVENTOR
Fritz Faulhaber
By: Mock-Blum
ATTORNEYS

Jan. 10, 1956  F. FAULHABER  2,730,025
PHOTOGRAPHIC REFLEX CAMERAS
Filed Dec. 10, 1952  4 Sheets-Sheet 4

INVENTOR
Fritz Faulhaber
By: Mock. Blum
ATTORNEYS

United States Patent Office 2,730,025
Patented Jan. 10, 1956

2,730,025

PHOTOGRAPHIC REFLEX CAMERAS

Fritz Faulhaber, Schonaich, Bezirk Boblingen, Germany, assignor to Voigtländer A. G., Braunschweig, Germany, a corporation of Germany Application December 10, 1952, Serial No. 325,055

Claims priority, application Germany December 10, 1951

9 Claims. (Cl. 95—42)

This invention relates to one-eye reflex cameras provided with a coupled film transport and shutter setting mechanism.

It has been known to carry out transport of the film and setting of the shutter in photographic cameras in one step by means of a handle or a previously set spring mechanism. In some of the known cameras, means are provided by which—after setting a spring mechanism—upon release the shutter is released and which bring about transport of the film, actuation of the picture counting mechanism and repeated setting of the shutter, so that in such cameras single pictures or series of pictures can be taken fully automatically. The spring mechanisms used for carrying out the camera functions, should not have unduly large dimensions in order to avoid an undesired increase in the size of the camera. For this reason, mostly spring mechanisms have been used, the power of which is sufficient for the actuation of the necessary elements in taking one picture only and which must be always reset after one picture has been taken. Spring mechanisms capable of being used in automatically taking series of pictures after a single setting of the spring, are used in so-called miniature cameras, in which, in view of the small size of the picture and the correspondingly low amount of work involved, no considerable forces are required.

In one-eye reflex cameras with objective shutter, in which, in addition to the transport of the film and setting of the shutter for taking a picture, additional parts, such as the reflex mirror and the cover flap for the picture window, have to be moved or actuated, a fully automatic or almost fully automatic drive has not been hitherto used. In such cameras, actuation was limited to transporting the film during the so-called setting, setting the shutter and bringing the mirror to the viewing position, i. e. the 45° position, against the pressure of a spring acting on the mirror. In these cameras, during the so-called release, the mirror is swung upward by its spring and the shutter is actuated to cause exposure. The setting and release takes place in such cameras by hand, by means of a handle.

According to the present invention, one-eye reflex cameras are actuated in a fundamentally new manner. In carrying out this invention, first a preparatory actuation of a handle, e.g . a knob, takes place and after this step, upon release, automatic actuation of all movable camera parts or parts which have not been actuated by operation of said handle, takes place. In proceeding in this manner, in general, together with the actuation of the handle, the film is transported and setting of the shutter is brought about and only residual functions have to be carried out by the gear. These residual functions are in general: movement of the mirror, picture window flap, shutter sectors, and diaphragm, and release of the shutter. Of course, other subsidiary steps can also be carried out, such as actuation of the counting device and the like.

In order to attain the above objects, in addition to the gear for transporting the film and setting the shutter, the camera is provided with an additional gear for moving or controlling the other camera organs which have to be actuated in taking a picture. This additional gear can be arranged near the mechanism for transporting the film and setting the shutter. However, the additional gear can also be arranged in the camera in spaced position from the first gear. Furthermore, the additional gear can be subdivided so that its parts are housed at various positions within the camera. In general, the additional gear is not independent and is in functional relation to the gear for transporting the film and setting the shutter. The two mechanisms may have a common drive, for example a spring mechanism. This drive need not be limited to the actuation of the camera for taking a single picture and can be designed for taking series of pictures. According to a preferred embodiment of the invention, one mechanism is actuated by hand and the other by spring action. Such arrangement has the advantage that by preparatory actuation of the handle, which is necessary anyhow, part of the necessary steps is taken care of and the spring mechanism has to bring about movement of the other parts only. It is clear that in such arrangement a weaker and, therefore, smaller spring mechanism can be used. One gear can be actuated by hand drive while the spring for the other gear is set separately. It has been found that no difficulties are caused and handling of the camera is not adversely affected if the spring for one gear is set simultaneously with the drive for the other gear. In general, the manual drive serves for actuating the gear for transporting the film and setting the shutter, while simultaneously with manual actuation of the handle also the spring for the additional gear is set, which is not actuated until after the release for taking a picture. In view of constructional advantages, it is preferred to arrange both gears on a common shaft, whereby the gear for transporting the film and setting the shutter is fixedly arranged on the handle. The two gears are connected by means of a spiral spring which, on or in the handle, is firmly connected with the gear for transporting the film and setting the shutter. The additional gear which has to control the before mentioned camera parts, moves the same from the initial position to the picture taking position and from there back again to the initial position.

The motive or control organs of the additional mechanism are preferably provided with rotating discs actuated by spring action, for example eccentric discs which are designed in such manner and preferably arranged on a common shaft in such manner that their rotation causes movement of the camera parts to be moved or controlled up to the exposure, in a predetermined sequence and after the exposure in a reversed sequence. However, other elements can also be used as motive or control organs, for example spur discs, levers or the like. In a manner known by itself, the camera may contain locking means in order to avoid double exposure. This can be attained for example if the push button or the like which can be depressed into the camera and brings about release of the gear and exposure, is blocked after being pressed down, and is released again only after repeated setting of the spring mechanism, when it returns to its original operative position. According to a preferred embodiment, the spring mechanism consists substantially of a spiral spring which is housed by the knob for effecting transport of the film and setting of the shutter, said spiral spring being fastened at its outer end to the inner wall of the knob and fastened at its inner end on a shaft for driving the mechanism. In a preferred embodiment, the mechanism for bringing about transport of the film and setting the shutter is combined with the setting knob to a single element and is also provided with a ratchet wheel which is adapted to be engaged by a stationary elastic pawl fastened to the camera. As a drive means for the transport of the film, in general, a cog wheel is used while the drive for setting the shutter is a disc. On the setting knob proper or on parts connected therewith, a lock for the setting means is arranged which blocks the spring mechanism after its setting and is automatically released after a picture is taken. In constructions for taking single pictures only, said locking means becomes in general active after one revolution of the setting knob. According to a preferred embodiment, the locking means comprises a radial peripheral slot in the rotatable element for setting the shutter, said slot being adapted to be engaged by the hook of a lever which is under spring action. Said lever is movable about a bearing pin extending through an elongated hole of the lever, so that it is tangentially displaceable relative to said rotatable element. The object of this arrangement is to avoid falling back into the slot of the locking hook immediately after release and to keep it on the periphery of the disc, so that it does not engage the slot again until after one revolution of the disc. A similar locking arrangement can be used for locking the additional mechanism during actuation of the first mechanism, so that actuation of the additional mechanism should not start simultaneously with the first mechanism. The rotating disc used in this connection, has likewise a radial peripheral slot adapted to be engaged by the hook of a lever which is under spring action. In order to effect release, the lever is caused to swing by the push or release button so that the locking hook is removed from the slot of the disc. In this manner, the disc and the entire mechanism is released for rotation. As the lever is under spring action, it returns after one revolution to the slot of the disc and thus locks the mechanism again. The push or release button which brings about unlocking, is held by another locking means in locked, i. e. depressed position until its release in connection with repeated actuation of the mechanism for transporting the film and setting the shutter.

In order to avoid sudden occurrence of functions brought about by spring tension, the gear is preferably coupled or capable of being coupled with a retard mechanism for reducing speed of movement, for example with an impeller mechanism of conventional type. A so-called delayed action release for the shutter, can also be inserted in the gear, preferably over the retard mechanism.

Figure 2:
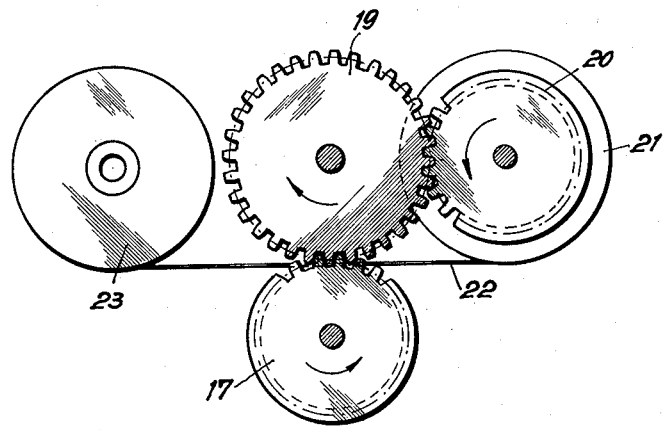
Figure 3:
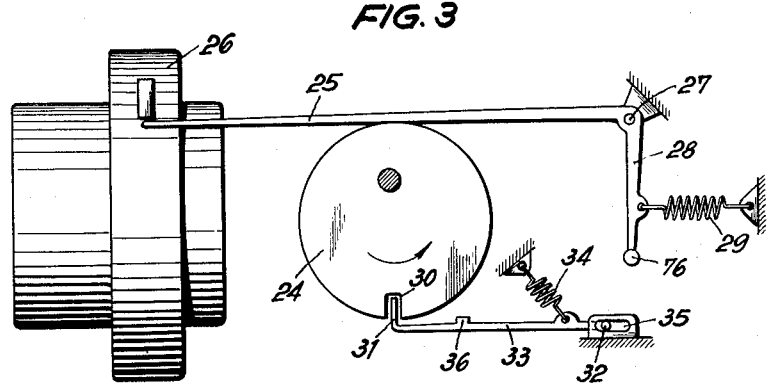
Figure 4:
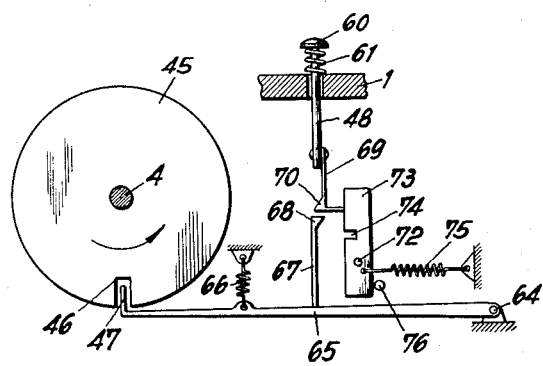
Figure 7:
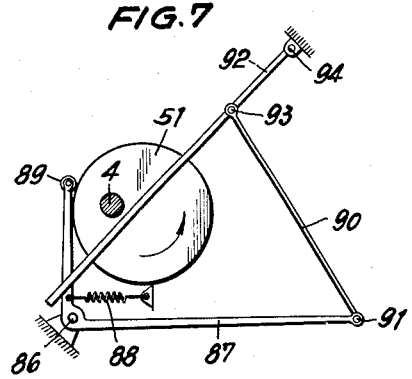
Figure 8:
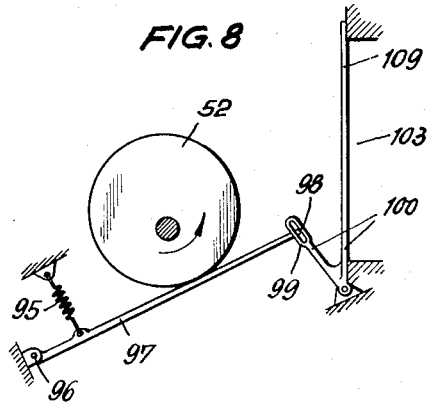
Figure 5:
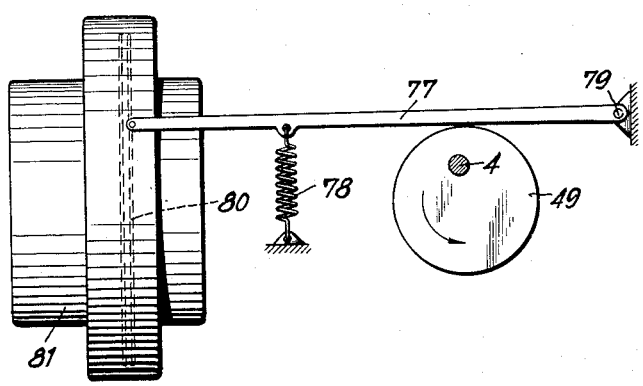
Figure 6:
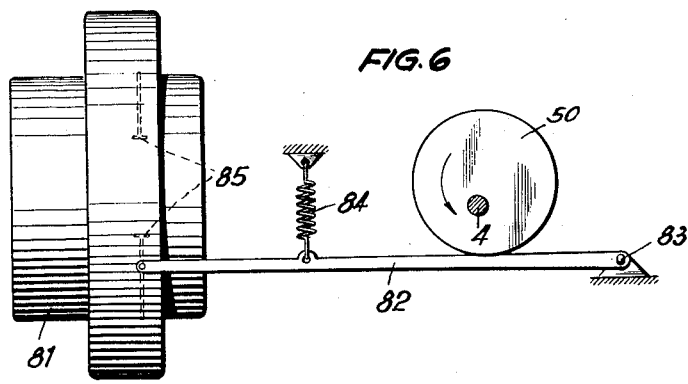
Figure 9:
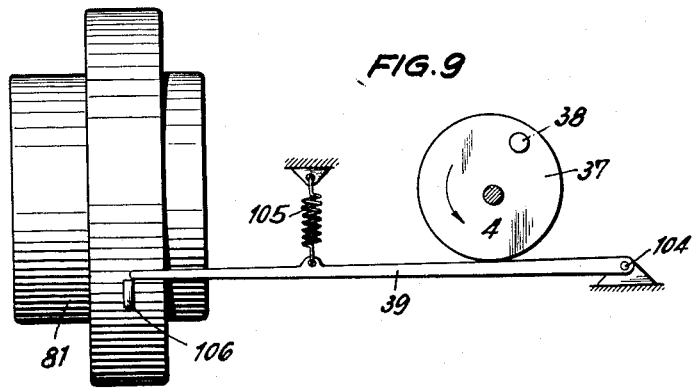

In the drawings, Figure 1 is the cross-section through a part of a reflex camera, containing the setting and driving mechanism; Figure 2 illustrates part of the mechanism shown in Figure 1, for the transport of the film; Figure 3 diagrammatically illustrates operation of a part of the mechanism for setting the shutter and locking the setting; Figure 4 is a diagram illustrating the function of the double exposure prevention means in connection with the release of the camera; Figure 5 illustrates the arrangement of parts which bring about movement of the shutter sectors; Figure 6 shows an arrangement similar to that in Figure 5 for adjustment of the diaphragm; Figure 7 diagrammatically illustrates the motive mechanism of the reflex mirror in the camera; Figure 8 diagrammatically illustrates the mechanism for moving the cover plate of the picture window of the camera; Figure 9 likewise diagrammatically illustrates the act of exposure, upon release of the shutter during picture-taking.

Referring now to the drawings in detail, in Figure 1 reference numeral 1 denotes the camera casing. A knob 5 is rotatably arranged in lateral wall 2, outside the camera, on the left in the drawing. A spiral spring 7 is housed by the hollow interior space 6 of knob 5, said spring being fastened by means of hooks 8 and 9 to the knob and to a shaft 4, respectively. One end of shaft 4 is journaled in partition 3 of the camera and its other end in knob 5. Rotatable knob 5, which has a knurled periphery 10, is provided with an extension 11, which is journaled at 12 in side wall 2 of the camera. This part 11 extends into the interior of the camera and is there connected with a toothed ratchet wheel 13, the teeth 14 of which are engaged by a swinging pawl 15 elastically held at 16 on camera wall 2. This pawl prevents backward rotation of knob 5 when the latter is under the tension of its interior spring. An adjacent large cog wheel 17 is firmly connected with ratchet wheel 13 and knob 5, and teeth 18 of wheel 17 are in engagement with the teeth of cog wheel 19 (see Figure 2). Said wheel 19 drives, over an additional cog wheel 20, the film take up spool 21, to which film 22 supplied from film spool 23, is wound up. A disc 24 is laterally fastened to cog wheel 17 (see Fig. 1). A lever 25 is elastically held against disc 24 and this lever sets objective shutter 26 upon rotation of knob 5 and of eccentric disc 24. Figure 3 diagrammatically illustrates operation of these elements. 24 is the eccentric disc, 25 an angle lever, which has a stationary pivot at 27 and the vertical arm 28 of which is under the effect of spring 29 so that lever 25 permanently bears against disc 24. The latter has a radial slot 30, which can be engaged by hook 31 of a lever 33, which is pivotally fastened at 32. Lever 33 is drawn toward disc 24 by stationary spring 34, so that hook 31 slides on the periphery of disc 24 when the hook is not in engagement with slot 30. Lever 33 is pivoted within elongated opening 35 so that said lever is somewhat displaceable in the direction of the periphery of disc 24. This pivot arrangement is used in order to prevent falling back of hook 31 into slot 30 immediately upon release, i. e. after its being lifted from slot 30. Owing to displacement of the lever by elongated opening 35, the hook will come to rest, after its removal from the slot, on the periphery of the disc and cannot enter the slot before a revolution of the disc is completed. Lever 33 is provided with a projection 36, by which the lever can be pressed out of slot 30. The hitherto described elements of the arrangement operate in such manner that upon one revolution of knob 5, over cog wheel 17, the film is transported and the shutter is simultaneously set by disc 24 over lever 25. After one revolution of knob 5, hook 31 falls into slot 30 and locks the setting means. The spring in knob 5 is now loaded. By ratchet wheel 13 and pawl 15, the knob is prevented from backward movement. The tension of the spring acts now on shaft 4 and on the parts connected thereto and described hereinafter, which are held until release by locking means connected therewith and described hereinafter.

An eccentric 37 provided with a projection 38, is fixedly mounted on shaft 4. This eccentric 37 cooperates with a lever 39 which brings about exposure by release of the shutter at a predetermined moment. Adjacent to eccentric 37 a cog wheel 40 is arranged, which operates a braking means consisting of an impeller 44 over pinion 41 and shaft 42 which is journaled in wall 3 and a partition 43. Likewise fastened to shaft 4 is a disc 45 provided with a radial slot 46, which is adapted to be engaged by a locking member 47 described hereinafter. This member effects the before mentioned locking of the parts connected with the shaft, against the tension of the spring, until release for exposure takes place. For the sake of simpler illustration, this locking member is diagrammatically shown as connected with the release rod, in Fig. 1.

A further eccentric 49 firmly connected to shaft 4 serves for adjusting sectors of the shutter. Eccentric 50 serves for adjustment of the diaphragm, eccentric 51 for movement of the mirror and eccentric 52 for movement of the picture window cover in the camera.

The discs firmly connected to shaft 4 cooperate with the parts dependent on them as follows.

Figure 4 illustrates those elements of the release which are essential for occurrence of the functions. Hook 47 of lever 65 engages, as a locking member, radial slot 46 of disc 45. Said lever 65 has a stationary pivot at 64 and is drawn by spring 66 toward disc 45. Lever 65 is provided with rod 67, the end of which carries a bevel projection 68. Release rod 48 provided with push button 60 and spring 61, is displaceably arranged in camera cover wall 1, above said projection 68. A pressing member 69, likewise provided with a bevel projection 70, is elastically fastened laterally to release rod 48 and said member 69 has a laterally projecting hook 71. Beside it, a lever 73 provided with slot 74 is capable of swinging about bolt 72. The upper part of lever 73 is urged by stationary spring 75 toward hook 71 of the release rod. Near the lower part of lever 73, a bolt 76 is arranged and the latter is fastened to angle lever 25, 28 which brings about setting of the shutter.

Upon pressing release rod 48 downward, lever 65 is caused to swing downward, over projection 70 and 68. Hook 47 releases slot 46 of the disc and the gear fastened to shaft 4 can rotate under spring effect. After one revolution, hook 47 engages again slot 46 of disc 45, i. e. the disc will then be locked again. The depressed release rod 48 is locked by projection 71 in slot 74 and remains in the depressed position even when disc 45 is already locked again, so that no repeated actuation of push button 60 can occur. Release and return to its original position of release rod 48 do not take place before preparing for the next exposure, i. e. at repeated setting of the shutter. In such setting, bolt 76 of angle lever 25, 28 (Fig. 3) indicated in Figure 4, causes lateral displacement of lever 73. Thereby projection 71 is released from slot 74 and release rod 48 is pressed outward by spring 61 and becomes thus available for repeated actuation. Projection 68 laterally displaces projection 70 which is laterally deflected by spring 69.

As will be understood from the above description and Fig. 4, spring member 69 is fastened at its upper end to the lower end of release rod 48. Its lower end is provided with a bevel projection 70 and a hook 71 and said projection is laterally deflected by spring 69. Upon pressing release rod 48 downward, the depressed release rod is locked by projection 71 in laterally deflected position in slot 74, so that in this position projection 70 is removed from the path of projection 68.

Eccentric 49 arranged on shaft 4, serves to cause movement of the shutter sectors. It is known that in one-eye reflex cameras with objective shutter, during viewing the picture on the ground-glass plate, the diaphragm and the shutter must be wide open and they are shut just before the picture is taken. In the case of the shutter sectors this is done by disc 49, as diagrammatically shown in Figure 5. A lever 77 pivoted at 79, is held by fixed spring 78 against the periphery of disc 49. The free end of said lever engages shutter sectors 80 to be displaced, located in objective shutter 81. Eccentric disc 50 (see Figure 6) acts in similar manner by displacing or adjusting the lamellae of the diaphragm. A lever 82 pivoted at 83 is held by fixed spring 84 against the periphery of disc 50. The free end of said lever engages lamellar ring 85 of the diaphragm in shutter 81, through the turning of which the diaphragm is adjusted. Before taking a picture, the diaphragm is adjusted to the desired size and reduction of the diaphragm opening to the size to be used in taking the picture is effected by the mechanism described above, shortly before taking the picture, while subsequently the diaphragm is readjusted to its full opening.

Eccentric 51 on shaft 4 is the so-called mirror eccentric. During its rotation, said eccentric brings about the necessary movement of the mirror in the camera, i. e. movement of the mirror, before taking a picture, toward the upper ground glass plate and the subsequent lowering to the 45° position for the next picture. In this arrangement, the details of which are diagrammatically illustrated in Figure 7, an angle lever 87, pivoted at 86, is held with a roller 89 against the periphery of disc 51. This angle lever is caused to move by rotation of eccentric 51 and this movement is transmitted over a transmission member 90, which is hinged to the angle lever at 91, to mirror 92, which is engaged by said transmission member at 93. The mirror is mounted in conventional, swinging manner at 94 in the camera. Of course, other systems, e. g. guiding of the mirror in slots, may also be used.

Eccentric 52 brings about movement of the flap which covers the picture window in the camera and releases the film or other sensitive material from time to time.

The motive mechanism is diagrammatically illustrated in Figure 8. Swinging lever 97, pivoted at 96, lies against eccentric 52, under the action of spring 95. The free end of said lever engages an elongated guide opening 99 of angle lever 100, the latter being pivotally fastened at 101. One leg of angle lever 100 is formed by cover flap 109, the picture window being shown at 103. Rotation of eccentric 52 causes swinging of cover flap 109 about pivot 101, i. e. opening or closing is thus effected.

The exposure proper, i. e. opening of the shutter sectors during the required period of time, is brought about by eccentric 37, in combination with a lever 39, as briefly mentioned above.

This procedure is diagrammatically illustrated in Figure 9. Lever 39, which is pivoted at 104, is held by spring 105 against the periphery of eccentric 37. Its end is connected with shutter release means 106 of objective shutter 81, the release being effected by movement of eccentric 37 at the proper moment. Said eccentric is provided with pin 38. The function of the latter consists in that, upon rotation of the eccentric, i. e. after a picture has been taken, locking of the setting knob and the parts fixedly connected therewith, which has been taken place directly after transport of the film and tensioning of the shutter, by engagement of eccentric disc 24 by hook 31, is released. Pin 38 (see Fig. 9) engages upon rotation of disc 37 projection 36 of lever 33 (see Fig. 3) and presses it downward and thus removes hook 31 from slot 30.

The lower part of the camera (see Fig. 1) also contains a sliding shaft 54, which is journaled in wall 3 and partition 53 and carries a pinion 55 fixedly connected to the shaft. Said pinion 55 can be brought in engagement, if desired, with a cog wheel 56 of retarding device 44. Said pinion can be used as the drive for delayed action means, not shown. Engagement can be brought about by push button 57, over sliding rod 58, by the fingers 59 of which pinion 55 can be displaced. Release rod 48 which carries push button 60, is urged outward by spring 61. The lower end of rod 48 has a bevel projection 62, which cooperates with a similar projection 63 provided on shaft 58. The delayed action means can be switched on, if desired, by means of push button 57. Upon unlocking the release rod, the delayed action means is also uncoupled by projections 62, 63.

Thus, the elements shown operate as follows. Upon turning knob 5, ratchet wheel 13 connected therewith, cog wheel 17 and disc 24 are caused to turn. Shaft 4 and the elements arranged on it remain in a state of rest. Thereby, the film is transported by cog wheel 17 and the shutter is tensioned by disc 24. After one revolution, knob 5 and its associated parts become locked and prevented from further rotation by the action of hook 31. Spring 7 in knob 5 is now tensioned over hook 9 on shaft 4. In order to take a picture, release rod 48 is depressed by means of knob 60. Simultaneously, hook 47 is removed from slot 46 of disc 45. The additional gear starts its rotation, while the released rod is kept in the depressed position. By action of the respective eccentrics, the shutter sectors are closed, the diaphragm is adjusted to a predetermined condition, the mirror caused to swing upward and the cover flap is removed from the picture window. Thereupon, release of the shutter takes place. Subsequently, in the reverse order, the cover flap is returned to the picture window, the mirror is lowered to its 45° position, the diaphragm is opened and the shutter sectors are also opened. After rotation, hook 47 engages again slot 46 of disc 45 and thus locks the gear again. At the end of the rotation, locking of knob 5 is released by the removal of hook 31 from slot 30 and knob 5 is ready for being actuated again now. Upon actuation of knob 5, i. e. upon repeated transport of the film and tensioning of the shutter, the release rod is released again and moves outward with its push button to its outer operative position. A different sequence of actuating the camera parts may also be used, if the taking of pictures is not affected. Actuation of retarding organ 44 and, if desired, use of the delayed action means, also does not affect the principle of the invention.

The term "one-eye reflex camera" and/or "one-eye mirror reflex camera" is used in the present application to denote reflex cameras in which a single front lens or front lens unit is used for focusing and arranging the subject and for making the picture.

It will be understood that the present invention is not limited to the specific arrangement, parts and constructive details described above and illustrated in the drawings and can be carried out with various modifications without departing from the scope of the invention as defined in the appended claims.

What is claimed is:

1. A one-eye mirror reflex camera comprising in combination coupled film transport and shutter setting means; a first gear system and a manually operable member for causing said first gear system to actuate the film transport means and shutter setting means and to charge a spring mechanism; a second gear system which is actuated only by said spring mechanism, is adapted to be started by a separate release member and running independently from the first gear system for (a) moving the members to be shifted from rest and viewing position to the ready for picture taking position, (b) subsequently releasing the shutter and (c) returning the shifted members to their rest and viewing position; the functions of the second gear system including, in step (a), closing of the shutter sectors, drawing shut a diaphragm ring to the selected value, upward swinging of the reflex mirror and displacement of a cover flap and in step (c) shifting back of said cover flap, swinging of the reflex mirror to viewing position, complete opening of said diaphragm ring and opening of the shutter sectors; said second gear system including means for carrying out said functions; said means comprising a plurality of eccentric discs fastened to a common shaft rotated by said spring mechanism; a separate eccentric disc being provided for actuation of the shutter sectors, for actuation of the diaphragm ring, for actuation of the reflex mirror, for operation of the cover flap and for the release of the shutter, respectively; each of said eccentric discs cooperating with lever means which is held against the respective disc and is adapted to engage with one of its ends portions of the camera member to be actuated, in order to carry out the said functions.

2. A reflex camera as claimed in claim 1, in which a lever is held against the periphery of the eccentric disc for actuation of the shutter sectors, one end of said lever being pivoted, while its other end is adapted to engage shutter sectors to be displaced; a second lever is held against the periphery of the eccentric disc for adjusting the diaphragm ring, one end of this second lever being pivoted, while its other end is adapted to engage lamellae of the diaphragm; a pivoted angle lever is held with the free end of one of its arms against the periphery of the eccentric disc for actuation of the reflex mirror and the free end of the other arm of the angle lever is connected by a transmission member to the mirror, in order to transmit the control action of the eccentric to the mirror; a third lever is held against the periphery of the eccentric disc for actuation of the cover flap, one end of said level being pivoted while its free end engages a guide opening in one arm of a pivotally fastened angle lever, the other arm of which is formed by the cover flap which is thus adapted to swing upon transmission of the control movement from the eccentric disc; a fourth lever is held against the periphery of the eccentric disc for releasing the shutter, one end of this lever being pivoted, while its other end is adapted to release the shutter.

3. A one-eyed reflex camera according to claim 1, in which the first and second gear are co-axially arranged; the axis of the second gear is arranged in a bore of the first gear and the first and second gears are connected by a spring which is fastened to the first gear and to the axis of the second gear.

4. A one-eyed reflex camera according to claim 1, comprising means for locking the separate release member after its actuation, in order to prevent double exposure and for releasing it upon repeated setting of the shutter; the double exposure preventing means comprising a lever held in position by a spring and provided with a slot adapted to be engaged by a projection of a release key which can be depressed against spring effect and is held in depressed position by said slot and projection until said lever is caused to swing upon actuation of the manually operable member and releases the separate release member.

5. A reflex camera as claimed in claim 1, in which the manually operable member consists of a knob connected with a ratchet wheel adapted to be engaged by an elastic, stationary pawl, with drive means for transport of the film and with drive means for the shutter setting organ.

6. A reflex camera as claimed in claim 1, in which the manually operable member consists of a knob connected with a ratchet wheel adapted to be engaged by an elastic, stationary pawl, with drive means for transport of the film and with drive means for the shutter setting organ; said drive means for transport of the film consisting of a cog wheel and said drive means for the shutter setting organ consisting of an eccentric disc, and these two means form a structural unit.

7. A reflex camera as claimed in claim 1, comprising means associated with the manually operable member, for locking the spring mechanism after setting the shutter and automatically releasing the lock after actuation of the second gear is completed; said locking means being formed by a radial peripheral slot of a rotatable member for setting the shutter and a hook of a lever which is under spring impulse, said hook being adapted to engage said slot, said lever being pivotally held by a pin and an elongated opening in order to be tangentially displaceable relative to said rotatable member.

8. A reflex camera as claimed in claim 1, in which the release member for the second gear comprises a rotatable disc provided with a radial, peripheral slot adapted to be engaged by a hook of a lever, which is under spring impulse, a release key adapted to be depressed into the camera and cause said lever to swing and thus release said disc and the second gear, the hook of said lever being adapted to re-engage said slot and thus lock the second gear after one revolution of the disc.

9. A reflex camera as claimed in claim 1, comprising retard means adapted to be coupled with the second gear.

References Cited in the file of this patent

UNITED STATES PATENTS

| | | |
|---|---|---|
| 1,388,870 | Lipp | Aug. 30, 1921 |
| 1,699,906 | Murray | Jan. 22, 1929 |
| 2,119,200 | Campbell | May 31, 1938 |
| 2,230,251 | Jochum | Feb. 4, 1941 |
| 2,550,698 | King et al. | May 1, 1951 |
| 2,608,921 | Studdert | Sept. 2, 1952 |
| 2,608,922 | Studdert | Sept. 2, 1952 |